United States Patent [19]

Barber

[11] 4,352,652
[45] Oct. 5, 1982

[54] APPARATUS FOR MOLDING PLASTIC PIPE FITTING WITH INTERNAL GROOVE THEREIN

[75] Inventor: Jasper D. Barber, Charlotte, N.C.

[73] Assignee: Charlotte Pipe and Foundry Company, Charlotte, N.C.

[21] Appl. No.: 246,865

[22] Filed: Mar. 23, 1981

[51] Int. Cl.³ ............................................. B29C 17/07
[52] U.S. Cl. ................................... 425/525; 264/573; 425/533; 425/387.1; 425/DIG. 218
[58] Field of Search ..................... 425/525, 533, 387.1, 425/DIG. 218; 264/573

[56] References Cited

U.S. PATENT DOCUMENTS 3,339,231  9/1967  Piotrowski ........................... 425/533
4,100,307  7/1978  Abano .................. 425/DIG. 218 X Primary Examiner—Jan H. Silbaugh
Attorney, Agent, or Firm—Bell, Seltzer, Park & Gibson

[57] ABSTRACT

The internal core of a molding apparatus does not have to be axially moved for molding a plastic pipe provided with a peripheral groove therein. This is accomplished by providing the internal core with a groove of such narrow width as to always be open to the surrounding cooperating mold body while at the same time preventing plastic material from entering the groove as the plastic material is being introduced into the mold cavity.

6 Claims, 6 Drawing Figures

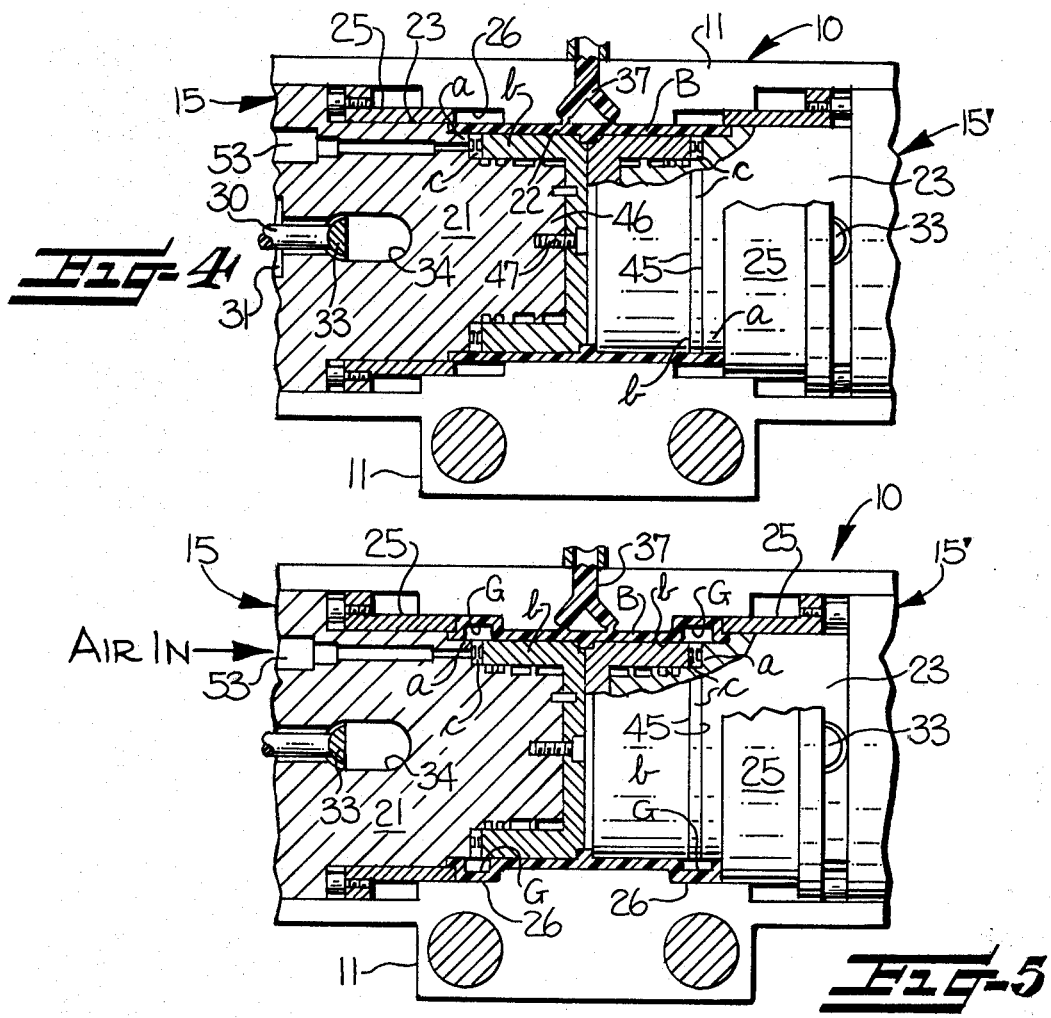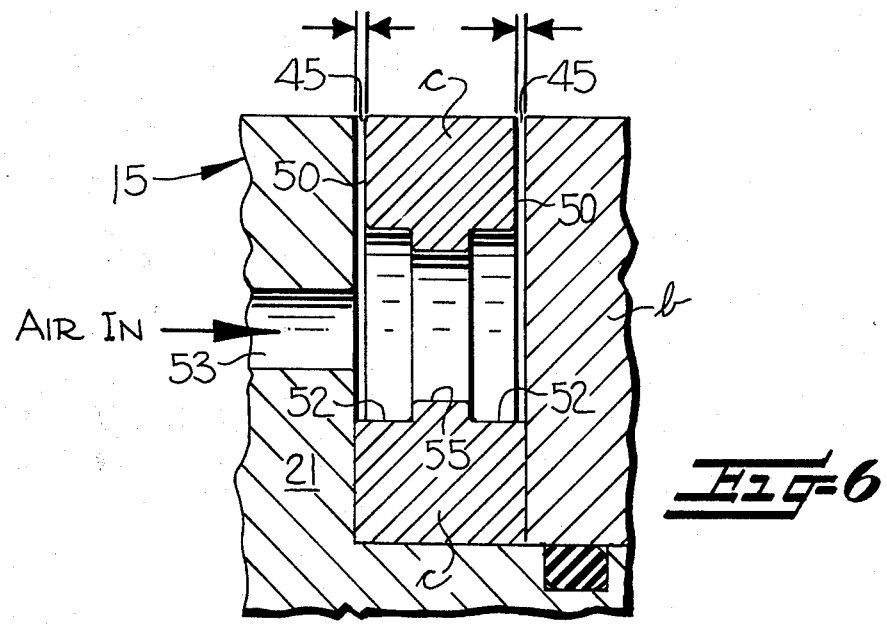

APPARATUS FOR MOLDING PLASTIC PIPE FITTING WITH INTERNAL GROOVE THEREIN

FIELD OF THE INVENTION

This invention relates to apparatus for producing plastic pipe joints or pipe fittings of synthetic resin and is particularly concerned with the injection molding of pipe joints having internal grooves therein for accommodating resilient seal rings therein.

BACKGROUND OF THE INVENTION

Various types of apparatuses and methods have been proposed heretofore for forming plastic pipe structures, such as pipe joints or fittings, of synthetic resin having an internal peripheral groove therein. It is generally economically advantageous to form the internal groove in the pipe structure before removing the same from the mold and while the synthetic resin material is in a plastic state, as opposed to forming the internal groove by machinery after removing the pipe structure from the mold.

An apparatus for injection molding a plastic pipe, and forming an internal peripheral groove for accommodating a seal ring therein, without removing the plastic pipe from the molding apparatus until after the internal groove has been formed, is disclosed in U.S. Pat. No. 4,100,307 (Asano), for example. According to the disclosure in this patent, an internal sleeve is axially movable within the mold and relative to an internal core, following injection of synthetic resin material into the mold and around the core, so as to form an annular cavity or opening around the plastic body, whereupon pressurized fluid, preferably in the form of compressed air, is introduced through a peripheral passage of the core toward the internal periphery of the plastic body to displace the body into the annular cavity and thereby form an internal annular groove in the plastic body. However, the passage through which the pressurized fluid is introduced is formed following the molding of the plastic pipe by moving an auxiliary core member, which is axially aligned with a main body of the core and is normally in end-to-end abutting relation to the main core body, axially away from the main core body.

SUMMARY OF THE INVENTION

With the foregoing in mind, it is an object of this invention to provide an improved molding apparatus for forming a plastic pipe having an internal peripheral groove therein and wherein a peripheral fluid passage around the core body is open at all times during use of the molding apparatus, thus avoiding the need for an axially movable auxiliary core member and the attendant apparatus for axially moving the same.

According to the present invention, a molding apparatus of the general type described includes an internal core provided with at least one radially outwardly facing, relatively narrow peripheral groove therein which is open to the periphery of the internal core at all times during the use of the molding apparatus, and which peripheral groove is positioned in radial alignment with an annular plastic-receiving groove defined in the mold by an axially movable sleeve when it occupies an outward position with respect to the mold, and wherein the peripheral groove is of such narrow width as to prevent the synthetic resin plastic material from being forced into and thereby clogging the peripheral groove when the synthetic resin material is being introduced into the cavity of the mold with the aforementioned sleeve then occupying an inward position relative to the mold. However, the width of the relatively narrow peripheral groove is sufficient for the passage of pressurized fluid, i.e., air, to pass therethrough and pressurize a portion of the plastic pipe into the annular plastic-receiving groove in the cavity of the mold when the sleeve occupies the outward position to thereby form an internal groove in the plastic pipe.

BRIEF DESCRIPTION OF THE DRAWINGS

Some of the objects and advantages of the invention having been stated, others will appear as the description proceeds when taken in connection with the accompanying drawings, in which

FIGS. 4 and 5 are fragmentary views similar to the central portion of FIG. 2, but illustrating successive stages in the operation of the molding apparatus following the injection of the plastic into the molding apparatus for forming an internal groove in the pipe connector adjacent each end thereof; and FIG. 6 is an enlarged fragmentary sectional view illustrating a preferred construction of the cylindrical body of one of the cores shown in FIGS. 1, 2, 4 and 5 for defining relatively narrow peripheral grooves in the periphery of the respective core cylindrical body.

DETAILED DESCRIPTION

Figure 1:
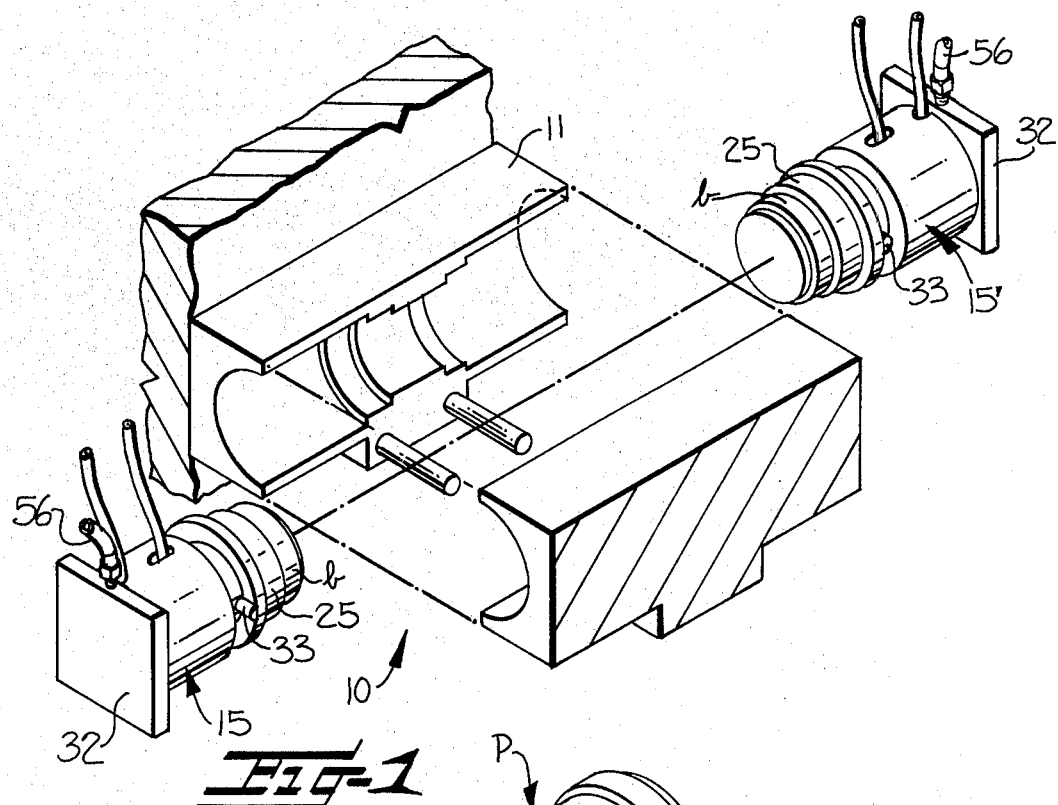
FIG. 1 is a partially exploded perspective view of a molding apparatus for forming plastic pipe structures according to the present invention.

Referring more specifically to the drawings, a split outer mold 10 is shown in FIG. 1 and includes a fixed outer mold section or body 11 and a movable outer mold section or body 12, the movable outer mold section 12 being movable away from the fixed outer mold section 11 to facilitate removing the pipe connector formed during the molding process. When the sections 11, 12 of the split outer mold 10 are assembled, they define therebetween a cylindrical chamber which is open at both ends for receiving therein respective internal cores 15, 15' whose proximal ends are then in abutting relation, as in FIGS. 2, 4 and 5, during the molding process.

Since both of the internal cores may be of essentially the same construction, only one of them will be described in detail, and like reference characters will apply to similar parts of both of the internal cores 15, 15', where applicable, in order to avoid repetitive description.

Accordingly, the internal core 15 comprises a main cylindrical body 21 adapted to fit in the mold chamber in spaced relation thereto for defining with the mold a cylindrical mold cavity 22 extending between the mold 10 and the core body 21. An annular shoulder means 23 on the core 15 defines a corresponding end of the mold cavity 22, and a sleeve 25 is axially movable on the shoulder means 23 between an inward position (FIG. 2) and an outward position (FIGS. 4 and 5). It will be observed in FIG. 2 that the sleeve 25 defines with the mold 10 a substantially uninterrupted end portion of the mold cavity 22 when the sleeve 25 occupies its inward position. When the sleeve 25 occupies the outward position shown in FIGS. 4 and 5, it can be seen that the sleeve 25 defines with the mold 10 an internal annular plastic-receiving groove 26 communicating with the mold cavity 22.

The sleeve 25 may be shifted inwardly and outwardly relative to the internal core by any suitable means, such as a double-acting cylinder or ram 30 positioned in a bore or cavity 31 formed in the outer portion of the internal core 15. The stator element or cylinder of the ram 30 is suitably secured to a cap plate 32 fixed to the outer end of the internal core 15, and the movable element or piston rod of the ram 30 is connected to a transverse bar 33. The transverse bar 33 extends through an elongate slot 34 formed in the internal core 15 and has opposite ends thereof suitably attached to substantially diametrically opposed portions of the sleeve 25.

Figure 2:
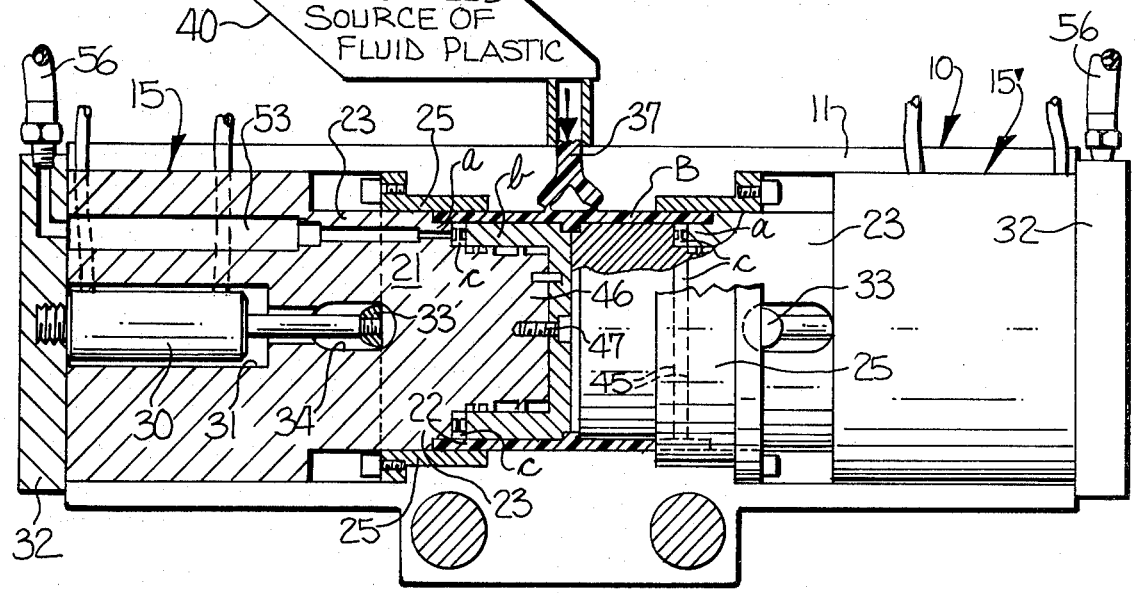
FIG. 2 is an enlarged elevational view, partially in section, showing only one of the halves of the mold of FIG. 1, and showing the internal cores in assembled relation to the mold body with a plastic pipe structure or fitting, in the form of a straight, tubular pipe connector, being formed by injecting a synthetic resin plastic into the mold.

Thus, by introducing fluid pressure into the outer end of the cylinder or stator element of the ram 30, it is apparent that the sleeve 25 will occupy its aforementioned inward position. On the other hand, upon introduction of fluid pressure into the inner end portion of the cylinder or stator element of the ram 30, it is apparent that the piston rod or movable element of the ram 30 will move outwardly, thus moving the sleeve 25 outwardly therewith to the position shown in FIG. 4. It is apparent that, for forming the tubular pipe connector P of FIG. 3, the internal cores 15, 15' and the respective sleeves 25 are positioned as shown in FIG. 2 initially to form a cylindrical cavity in the general shape of the pipe connector P to be formed. Thereafter, soft or molten synthetic resin plastic is injected into the cylindrical mold cavity via a sprue runner or runners 37 by suitable means schematically represented in FIG. 2 as a pressurized source of fluid plastic generally designated at 40 to form a cylindrical molded plastic body B in the mold cavity 22.

While the cylindrical molded plastic body B is still in an unhardened condition, the sleeves 25 are moved outwardly, relative to the mold 10 and the respective internal core cylindrical bodies 21, from the position of FIG. 2 to the position of FIG. 4 to thus form the internal annular plastic-receiving grooves 26 in the mold adjacent the respective shoulder means 23.

In accordance with the invention, in order to form the opposite end portions of the plastic body B into the plastic-receiving grooves 26 and to thereby form internal grooves G extending about the inner peripheral surface of the pipe connector P being formed so as to permit subsequently positioning a seal ring or the like therein, the cylindrical body 21 of each internal core 15, 15' is provided with at least one relatively narrow peripheral groove therein which is open to the periphery of the internal core at all times during use of the apparatus and is positioned in radial alignment with the respective plastic-receiving groove 26 defined in the mold by the respective axially movable sleeve 25 when it occupies the outward position, and each such peripheral groove is of such narrow width as to prevent the plastic material from entering and clogging the peripheral groove when the plastic material is initially being introduced into the mold cavity. As preferred, two of the relatively narrow peripheral grooves are provided in the cylindrical body of each of the internal cores 15, 15'.

As preferred, and by way of illustration, it will be observed in FIG. 6 that two of the relatively narrow peripheral grooves 45 are provided in the portion of the cylindrical body 21 of the internal core 15 there shown. It has been determined that the width of each such peripheral groove 45 should be no more than about 0.003 inch (0.0762 mm) around the periphery of the core body to ensure that the plastic material will not enter and clog the peripheral grooves when the plastic material is being introduced into the mold cavity. Therefore, to facilitate formation of grooves of such relatively narrow width, the cylindrical body 21 of the internal core 15 is constructed in a plurality of coaxial sections, namely, an outer or main body section a and an inner end cylindrical body section b spaced axially apart from each other, with a cylindrical intermediate or filler section c positioned in the space between the cylindrical body sections a, b and in abutting relation thereto.

It will be noted that the first cylindrical body section a projects axially from and is of lesser diameter than the shoulder means 23 of the core, and that the core also includes a cylindrical hub 46 projecting axially from and being of lesser diameter than the first cylindrical body section a. The second cylindrical body section b is mounted on and secured to the hub 46 as by means of a screw or bolt 47 penetrating the end of the second cylindrical body section b which overlies the corresponding inner end of the hub 46. As best shown in FIG. 6, the filler section c fits in the space between and in juxtaposition to the first and second cylindrical body sections a, b and is also mounted on the hub 46. Thus, the screw 47 serves as means clampingly securing the second body section b to hub 46 and against the filler section c, and also serving to clamp the filler section c against the first body section a. Also, it will be noted that the filler section c has an outer periphery coinciding with the outer peripheries of the first and second cylindrical body sections a, b of the core body 21, and in order to form the relatively narrow peripheral grooves 45 in the periphery of the cylindrical core body, it will be observed in FIG. 6 that each side of the filler section c is provided with an annular recess 50 therein which annular recess thus defines an annular end surface facing axially on the corresponding side of the cylindrical filler section c and thus forms one side surface of the recess 50.

Each side surface defining the recess 50 has a continuous annular fluid-flow distributing channel 52 therein which is in open communication substantially throughout its extent with the annular recess 50, and the core body has a fluid passage 53 therein communicating with the fluid-flow distributing channels 52, via an opening 55 (FIG. 6) extending between the two channels 52. The aforementioned fluid passage 53 is such that it communicates with the channels 52, via the opening 55 therebetween, for directing fluid pressure into the channel so that the fluid pressure will pass outwardly through the peripheral grooves 45 and against the inner surface of the previously formed plastic body B in the mold 10, thus causing the plastic material to flow into the annular plastic-receiving groove 26 at the corresponding end of the mold cavity, and thus forming a corresponding groove G on the internal surface of the plastic pipe structure or connector P (see FIGS. 3 and 5).

As heretofore indicated, the width of each peripheral groove 45 taken in the axial direction, and thus the axial depth of each recess 50, is no more than about 0.003 inch (0.0762 mm). The depth of each peripheral groove 45 in the radial direction is not critical, but since the cylindrical filler section c is shown as being in the form of an annulus or ring, it is preferred that the radial depth of each groove 45 does not extend all the way through the annular portion or body of the ring to the periphery of the hub 46. By way of example, in an actual apparatus constructed according to this invention, the filler section c had an inside diameter of about one and three-fourths inches (44.45 mm), an outside diameter of about four and one-fourth inches (107.95 mm), and a thickness of about one-fourth inch (6.35 mm) in the axial direction. The depth of each peripheral groove 45 (and thus the width of each recess 50) in the radial direction was about three-eighths inch (9.53 mm), and the width of each annular fluid-flow distributing channel in the radial direction was about one-fourth inch (6.35 mm). Desirably, the depth of each annular fluid-flow channel 52 taken in the axial direction is considerably greater than the axial depth of each recess 50 forming the respective peripheral grooves 45 in the periphery of the cylindrical core body. For example, in the aforementioned actual apparatus, the depth of each fluid-flow distributing channel 52 was about 0.080 inch (2.032 mm).

Figure 3:
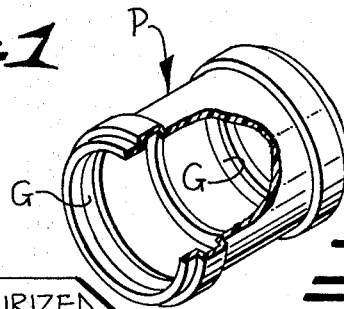
FIG. 3 is a perspective view of a pipe connector as formed in the illustrated embodiment of the molding apparatus of the present invention.

As best shown in FIGS. 2, 4 and 5, the fluid passage 53 for directing fluid pressure into the fluid-flow distributing channels 50 of the filler section c extends longitudinally of the corresponding internal core 15 with its outer portion being communicatively connected to a fluid pressure line 56 extending from a suitable source of controlled fluid pressure, not shown. It is apparent that the fluid under pressure is injected into the passage 53 and thus caused to flow outwardly through the relatively narrow peripheral grooves 45 and the cylindrical body of the internal core while the internal core 15 and the sleeve 25 occupy the position shown in FIGS. 4 and 5, and while the plastic body B still is in an unhardened state, thus causing the plastic body to be molded outwardly into the internal annular plastic-receiving groove 26 and so that, as shown in FIG. 3, each end portion of the pipe connector P has an internal annular groove G and a corresponding external annular projecting rim or ridge therearound. Thereafter, the plastic is cooled and solidified, and the pipe connector P is removed from the mold by retracting the internal cores 15, 15' and their respective sleeves 26 outwardly of the opposite ends of the mold 10 and moving the movable mold section 12 outwardly away from the stationary or fixed mold section 11 preparatory to a succeeding cycle in the operation of the apparatus being effected.

From the foregoing description, it can be seen that there is provided an improved apparatus for forming a plastic pipe structure wherein the core of the apparatus is provided with an annular peripheral groove which is open at all times during the operation of the molding apparatus so as to readily present to the mold surface, at the proper time, a blast or blasts of fluid which will pressurize and deform the corresponding end of the plastic material previously molded in the apparatus for forming a corresponding internal groove on the pipe structure being molded, and wherein the annular groove in the core is of such relatively narrow width as to prevent the plastic material from entering and clogging the peripheral groove when the plastic material is initially being introduced into the mold cavity.

In the drawings and specification, there has been set forth a preferred embodiment of the invention, and although specific terms are employed, they are used in a generic and descriptive sense only, and not for purposes of limitation, the scope of the invention being defined in the claims.

That which is claimed is:

1. In an apparatus for forming a plastic pipe structure having a groove on the internal surface thereof and including
   (a) a mold having a cylindrical chamber therein,
   (b) an internal core having a cylindrical body adapted to fit in the mold chamber in spaced relation thereto for defining with the mold a mold cavity extending between the mold and the core body,
   (c) shoulder means on the core defining an end of the mold cavity,
   (d) a sleeve axially movable on the shoulder means between an inward position and an outward position, wherein the sleeve defines with the mold a substantially uninterrupted end portion of the mold cavity when the sleeve occupies its inward position, and the sleeve defines with the mold an internal annular plastic-receiving groove communicating with the mold cavity when the sleeve occupies the outward position,
   (e) means for introducing plastic material into the cavity when the sleeve occupies said inward position to form a plastic pipe structure therein, and
   (f) means for moving the sleeve to the outward position, the combination therewith of an improvement in the internal core wherein:
   (g) the cylindrical body of the internal core is provided with a pair of relatively narrow peripheral grooves therein which are open to the periphery of the internal core at all times during use of the apparatus and are positioned in radial alignment with the plastic-receiving groove defined in the mold by the axially movable sleeve when it occupies said outward position, said peripheral grooves being of such narrow width as to prevent the plastic material from entering and clogging the peripheral grooves when the plastic material is being introduced into the mold cavity,
   (h) means for introducing fluid pressure into the core body to flow outwardly through said peripheral grooves when the sleeve occupies said outward position to cause the fluid to pass through said peripheral grooves and pressurize a portion of the plastic pipe structure into the internal plastic-receiving groove in the mold cavity to form an internal groove in the pipe structure, and
   (i) wherein said cylindrical body further includes at least two axially spaced-apart cylindrical body sections, and a cylindrical filler section in the form of a ring, said ring having an annular recess on each side thereof and positioned in the space between said cylindrical body sections and in abutting relationship thereto such that said ring forms a part of the cylindrical body of said core, and wherein said cylindrical body sections and said ring collectively define the periphery of said body and said annular recesses in said ring define said relatively narrow peripheral grooves through which fluid pressure is directed.

2. A structure according to claim 1 wherein the width of each of said peripheral grooves is no more than about 0.003 inch (0.0762 mm) around the periphery of said core body.

3. In an apparatus for forming a plastic pipe structure having a groove on the internal surface thereof and including
(a) a mold having a cylindrical chamber therein,
(b) an internal core having a cylindrical body adapted to fit in the mold chamber in spaced relation thereto for defining with the mold a mold cavity extending between the mold and the core body,
(c) shoulder means on the core defining an end of the mold cavity,
(d) a sleeve axially movable on the shoulder means between an inward position and an outward position, wherein the sleeve defines with the mold a substantially uninterrupted end portion of the mold cavity when the sleeve occupies its inward position, and the sleeve defines with the mold an internal annular plastic-receiving groove communicating with the mold cavity when the sleeve occupies the outward position,
(e) means for introducing plastic material into the mold cavity when the sleeve occupies said inward position to form a plastic pipe structure therein, and
(f) means for moving the sleeve to the outward position, the combination therewith of an improvement in said internal core wherein:
(g) the cylindrical body of the core comprises a first cylindrical body section projecting axially from and being of lesser diameter than the shoulder means of the core, said core also including a cylindrical hub projecting axially from and being of lesser diameter than said first cylindrical body section, the core body further comprising a second cylindrical body section spaced axially from said first body section, means securing said second body section to said hub, a cylindrical filler section fitting in the space between, and in juxtaposition to, said first and second cylindrical body sections and mounted on said hub, said filler section having an outer periphery coinciding with the outer peripheries of said first and second cylindrical body sections of the core body, at least one side of said filler section being provided with an annular recess defining a relatively narrow peripheral groove in the cylindrical body of the core and positioned in radial alignment with the plastic-receiving groove defined in the mold by the axially movable sleeve when it occupies said outward position, said peripheral groove being of such width as to prevent the plastic material from entering and thereby clogging the peripheral groove when the plastic material is being introduced into the mold cavity, and
(h) means for introducing fluid pressure into the core body and directing the fluid pressure outwardly through the last-named peripheral groove when the sleeve occupies said outward position to cause the fluid to pass through said peripheral groove and pressurize a portion of the plastic pipe structure into the internal plastic-receiving groove in the mold cavity to form an internal groove in the pipe structure.

4. A structure according to claim 3 wherein said cylindrical filler section includes an annular end surface facing axially on said one side of said cylindrical filler section and thus defining one side surface of said recess, said recess side surface having a continuous annular fluid-flow distributing channel therein in open communication substantially throughout its extent with said annular recess, and said core body having a fluid passage therein communicating with said channel for directing fluid pressure into said channel so that the fluid pressure will pass outwardly through said peripheral groove.

5. A structure according to claim 4 wherein the width of said peripheral groove taken in the axial direction, is no more than about 0.003 inch (0.0762 mm), and wherein the depth of said annular fluid-flow channel also taken in the axial direction is considerably greater than the axial depth of said recess.

6. In an apparatus for forming a plastic pipe structure having a groove on the internal surface thereof and including
(a) a mold having a cylindrical chamber therein,
(b) an internal core having a cylindrical body adapted to fit in the mold chamber in spaced relation thereto for defining with the mold a mold cavity extending between the mold and the core body,
(c) shoulder means on the core defining an end of the mold cavity,
(d) a sleeve axially movable on the shoulder means between an inward position and an outward position, wherein the sleeve defines with the mold a substantially uninterrupted end portion of the mold cavity when the sleeve occupies its inward position, and the sleeve defines with the mold an internal plastic-receiving annular groove communicating with the mold cavity when the sleeve occupies the outward position,
(e) means for introducing plastic material into the mold cavity when the sleeve occupies said inward position to form a plastic pipe structure therein, and
(f) means for moving the sleeve to said outward position,
the combination therewith of an improvement in the internal core wherein the cylindrical body thereof comprises:
(g) a first cylindrical body section projecting axially inwardly from and being of lesser diameter than the shoulder means on the core,
  1. a cylindrical hub projecting axially inwardly from and being of lesser diameter than said first cylindrical body section,
(h) a second cylindrical body section spaced axially from said first body section and mounted on said hub,
(i) a cylindrical filler section fitting between said first and second cylindrical body sections, mounted on said hub, and having an outer periphery coinciding with the peripheries of said body sections,
(j) means clampingly securing said second body section to said hub and against said filler section and serving to clamp said filler section against said first section,
(k) at least one side of said cylindrical filler section having an annular recess therein defining a radially outwardly open relatively narrow peripheral groove between said filler section and the respective adjacent cylindrical body section, said peripheral groove being located in radial alignment with the plastic-receiving groove defined in the mold when the movable sleeve occupies its said outward position, and said peripheral groove being of such narrow width as to prevent plastic material from entering the peripheral groove, and thereby clogging the same, when the plastic material is being introduced into the mold cavity, and
(l) means for introducing fluid pressure into the core body and directing the fluid pressure outwardly through the last-mentioned peripheral groove when the movable sleeve occupies said outward position to cause the fluid to pass through said peripheral groove and pressurize a portion of the plastic pipe structure into the internal plastic-receiving groove in the mold cavity to form an internal groove in the pipe structure.

* * * * *